United States Patent
Chang et al.

(10) Patent No.: US 8,798,446 B2
(45) Date of Patent: Aug. 5, 2014

(54) PLAY BACK DEVICE WITH ADAPTIVE TRICK PLAY FUNCTION

(75) Inventors: Chiew Mun Chang, Singapore (SG); Swee Swee Tang, Singapore (SG); Cheng Tao, Grenoble (FR)

(73) Assignee: Thomson Licensing, Boulogne-Billancourt (FR)

( * ) Notice: Subject to any disclaimer, the term of this patent is extended or adjusted under 35 U.S.C. 154(b) by 522 days.

(21) Appl. No.: 12/452,410

(22) PCT Filed: Jun. 17, 2008

(86) PCT No.: PCT/EP2008/057629
§ 371 (c)(1), (2), (4) Date: Mar. 11, 2010

(87) PCT Pub. No.: WO2009/013076
PCT Pub. Date: Jan. 29, 2009

(65) Prior Publication Data
US 2010/0189412 A1    Jul. 29, 2010

(30) Foreign Application Priority Data
Jun. 29, 2007 (EP) .................................... 07301191

(51) Int. Cl.
*H04N 5/783* (2006.01)
*H04N 9/80* (2006.01)

(52) U.S. Cl.
USPC .......................................... 386/343; 386/248

(58) Field of Classification Search
USPC ................... 386/343–352, 239–248
See application file for complete search history.

(56) References Cited

U.S. PATENT DOCUMENTS

| 6,208,801 | B1 | 3/2001 | Kambayashi et al. |
| 2003/0072556 | A1* | 4/2003 | Okujima et al. ............... 386/46 |
| 2006/0080591 | A1 | 4/2006 | Huang et al. |

FOREIGN PATENT DOCUMENTS

| EP | 1531474 | 5/2005 |
| EP | 1729300 | 12/2006 |
| WO | WO 2007/097218 | 8/2007 |

OTHER PUBLICATIONS

The Search Report Dated September 30, 2008.

* cited by examiner

Primary Examiner — Hung Dang
(74) Attorney, Agent, or Firm — Tutunjian & Bitetto, P.C.

(57) ABSTRACT

The present invention relates to a method for play back a digitized video streams at different fast forward speed levels, wherein at least one speed level is adapted so that a remaining portion of the stream is played back within a predefined time interval, and to a playback device for playing back a digitized video streams at different speed levels.

11 Claims, 2 Drawing Sheets

PLAY BACK DEVICE WITH ADAPTIVE TRICK PLAY FUNCTION

Figure 1:
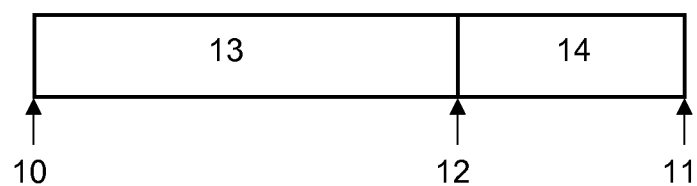

This application claims the benefit, under 35 U.S.C. §365 of International Application PCT/EP2008/057629, filed Jun. 17, 2008, which was published in accordance with PCT Article 21 (2) on Jan. 29, 2009 in English and which claims the benefit of European patent application No. 07301191.8, filed Jun. 29, 2007.

The present invention relates to a method for play back a digitized video stream at different fast forward speed levels and to a playback device for playing back a digitized video stream at different speed levels.

In known systems, a digitized video stream can be played back with different speed levels. A 'normal' speed level which corresponds to play back the movie in real time is defined. This means, for example, the playback time of a one-minute scene is one minute. Further, playback can be performed in forward and in backward direction with higher speed levels, which is known as fast forward and fast backward, respectively. Playback can also be performed in forward direction with lower speed levels, which is known as slow motion.

Commonly known playback devices support multiple fast forward and fast backward speeds. In general, double speed (2x) is provided which plays back the digitized video stream twice as fast as in normal mode. This means, the playback time of a two minutes scene is one minute. Further, some devices provide a four times fast forward mode (4x). Eight or ten times fast forward modes (8x, 10x) are also often provided. In this case, within one minute an eight or ten minutes scene can be viewed. The user selectable fast forward speeds are dependent on the playback device. Usually, the fastest fast forward speed provided by the playback device is an adequate speed to go through a recording of normal length quickly, but the content of the movie can be estimated by the user at the same time.

One possibility to have a fast forward playback is to display every second image and to skip the others for double speed, to display every fourth image and to skip the others for 4x speed, or in general to display every n-th image and to skip the others for nx speed. This has disadvantages if the movie is compressed, e.g. according to an MPEG format, as in such chases it might be complicated to access to certain n-th images due to compression.

Another possibility is to display every n-th group of images or group of pictures, and to skip n−1 others. This also gives roughly the desired n-times speed provided the length of the groups is constant.

A further possibility is as follows:

A searching table is applied defining how many groups of images, sometimes called Video Object Units, of the digitized video stream have to be skipped in accordance to display the movie with a certain fast forward speed. In this case n-times speed can be reached even when the length of the groups or units is not constant.

WO 2004/051998 discloses a method and apparatus for recording a data stream on a storage medium for improving non-linear play back performance of the recorded data. When a data stream is received, the I-pictures from the data stream are stored in a first buffer and the remaining data from the stream are stored in a second buffer. Each time the first buffer becomes full, the I-pictures stored in the first buffer are written onto an intra-coded allocation unit on the storage medium. Then, the contents of the second buffer are written onto preferably a subsequent inter-coded allocation unit. This offers a mechanism to minimize seeking in the stored video data during trick play modes.

If these methods remain unchanged, in case of a long hour recording, the user has to wait a long time if he wants to skip a notable part of the movie.

It is an object of the invention to improve the known solution.

According to the invention, a method for play back a digitized video stream at different fast forward speed levels checks for the remaining play back time of the current recording. In dependence of this time, a fast forward speed is determined which allows to play back the remaining part of the recording within a predefined time. The remaining part of the recording is then played back with the determined fast forward speed. This has the advantage, that the fast forward method becomes dynamic and flexible. In case of long hour recordings, the user does not have to wait too long to skip a relevant part of the recording. This is especially true, if the recording does not have any bookmarks or other defined positions to which a jump could be made. According to an aspect of the invention, the predefined time to play back the remaining part of the recording is set in the device to be a certain number of minutes, e.g. to be one minute. According to a further aspect of the invention, this predefined time is user selectable or is depending on other conditions. This has the advantage that the user can find a compromise between going through the recording very fast and being able to watch which scenes are skipped. According to an aspect of the invention, determining the fast forward speed is done, e.g. by computing an adequate fast forward speed or by using a lookup table to determine the fast forward speed. The remaining part of the recording is then played back with this fast forward speed. This has the advantage that the method is kept flexible and can be integrated easily in known play back methods, in which for example a table with different fast forward speeds and the respective jump-in positions are already available. According to a further aspect of the invention, the user is allowed, e.g. to stop play back with this fast forward speed and to select play back with normal speed or with a different fast forward speed. This has the advantage that the method is similar to methods implemented in known devices to which the user is used to but provides more flexibility at the same time. A fast backward method is implemented in the same way.

In an advantageous manner, there is at least one user selectable fast forward speed to be determined according to the remaining playback time of the current recording. The method keeps at least one user selectable fast forward speed unchanged in case the remaining part of the recording is below a predefined time. This has the advantage that for remaining parts of the recording for which the available fast forward speeds are appropriate, the method does not change anything.

In an advantageous manner, there are at least two user selectable fast forward speeds. The highest of the several user selectable fast forward speeds is determined such that the remaining part of the recording is played back within a predefined time. The other fast forward speeds are kept predefined and unchanged. In common devices, the other fast forward speeds are for example 2x, 4x, 8x fast forward. This has the advantage that the method provides fast forward functions to which the user is used to. Furthermore, the method also provides at the same time an advanced fast forward function which is depending on the remaining part of the recording.

In an advantageous manner, at least one fast forward speed is scaled by a scale factor according to the fast forward speed determined to play back the remaining part of the recording within a predefined time, e.g. one minute. This has the advantage that the user does not have to wait too long to skip a relevant part of the recording. Further fast forward speeds are scaled that the remaining part of the recording is played back within other predefined times, e.g. five minutes, ten minutes. This has the advantage, that the user has the choice how much time he wants to spend on watching the remaining part of the movie in fast forward mode.

In an advantageous manner, a second fast forward speed is defined which is half of the fast forward speed determined to play back the remaining part of the recording within a predefined time. In a further advantageous manner, all other fast forward speeds are kept unchanged. This has the advantage that the method provides two dynamic and flexible fast forward speeds and still provides fast forward modes to which the user is used to.

In an advantageous manner, the method for play back a digitized video stream at different speed levels includes checking if adaptive fast forward mode is selected. If adaptive fast forward mode is selected, it is checked if the remaining play back time of the current recording is longer than a predefined time. If the remaining play back time of the current recording is longer than a predefined remaining play back time a scale factor is determined to play back the remaining part of the current recording within a predefined fast forward play back time, e.g. one minute. At least one of the fast forward speeds is scaled by a scale factor. The remaining part of the recording or a fraction thereof is played back with at least one of the scaled fast forward speeds. This has the advantage that the user can go trough the remaining part of the recording quickly and at the same time has the chance to switch back to normal playback or fast forward mode. If the remaining play back time of the current recording is not longer than a predefined time or adaptive fast forward mode is not selected, the remaining part of the recording is played back with normal fast forward speeds. This has the advantage that the method is similar to methods implemented in known devices to which the user is used to but provides more flexibility at the same time.

In an advantageous manner, in case adaptive fast forward mode was selected and fast forward speeds were determined and a part of the remaining recording was played back with at least one of these adaptive fast forward speeds, the user can select play back at normal speed or at a slower fast forward speed to find out which part of the recording is currently played back. If he does so for at most a maximum predefined time and afterwards selects again adaptive fast forward mode, the already determined fast forward speeds are used for fast forwarding the remaining part of the playback or a fraction thereof. This has the advantage, that during adaptive fast forward mode the user is able to watch a certain part of the movie at normal speed or a slower fast forward speed to identify the currently played back part of the movie and afterwards the user can select fast forwarding the recording with the already determined fast forward speeds. During adaptive fast forward mode, the adaptive fast forward speeds do not change every time the user watches a part of the recording in more detail.

In an advantageous manner, the determined fast forward speeds are converted into time steps. Using the time step and the current time stamp of the part of the recording which is currently played back, a target time stamp in the video stream is calculated. Time search mode is applied for selecting a picture related to the target time stamp. Said picture is displayed for a predefined time. After displaying said picture for a predefined time, a new time stamp is determined using the time steps. Further, time search mode is applied for selecting the next picture related to the new target time stamp and the picture is displayed for a predefined time. These steps are repeated until fast forward play back of the recording is finished or another playback mode is selected by the user. This has the advantage that the adaptive fast forward mode is easily integrable in the known fast forward methods. The adaptive fast forward method is realizable in known devices with minor adoptions. In a further advantageous manner, a certain number of consecutive pictures are displayed using normal play back speed at each determined target time stamp instead of displaying a single picture for a predefined time. This has the advantage that short scenes of the recording are presented with normal play back speed to the user during fast forward mode and the user is able to realize best which part of the recording is currently displayed. The user is enabled to decide if he wants to continue playing back the recording with adapted fast forward speed or if he wants to play back the movie at normal speed because he reached the part of the movie he was searching for.

According to the invention, a play back device for play back a digitized video stream at different speed levels performs the inventive methods.

According to the invention, the same method and the same device are also applicable for fast backward play back.

The invention is now described in more detail using exemplary embodiments shown in the figures.

The scope of the presented invention is not limited to the described examples.

FIG. 1 schematically depicts a long hour recording

Figure 2:
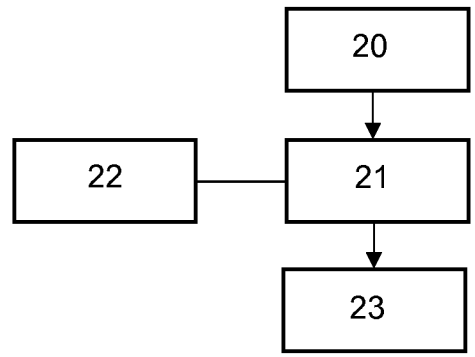
Figure 3:
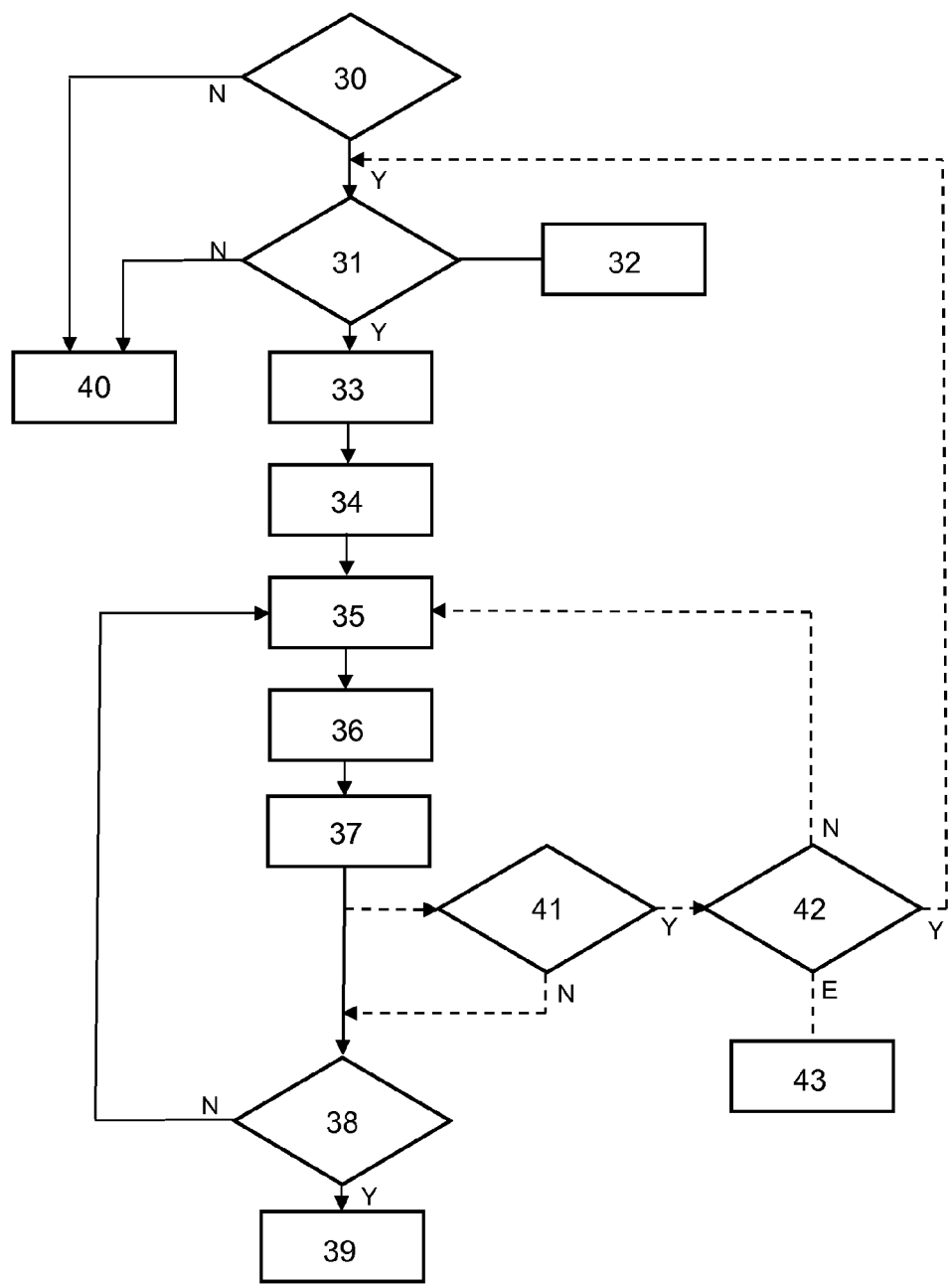
Figure 4:
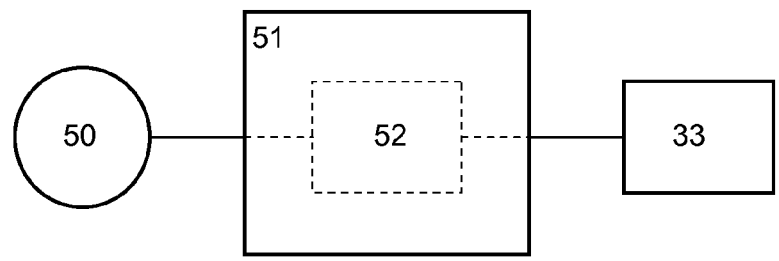

FIG. 2 shows a method for play back a digitized video stream using adapted fast forward speeds FIG. 3 shows a method for play back a digitized video stream using a scaling factor for adapting fast forward speeds FIG. 4 shows a device for performing adaptive search FIG. 1 schematically depicts a long hour recoding. A long hour recording contains at least one recorded program. The start of the recording is at time 10. Time 11 indicates the end of the recording. The current play back position of the recording is at time 12. The part of the recording before the current play back position 12 is the part of the recording already played back 13. The part of the recording between the current play back position 12 and the end of the recording 11 corresponds to the remaining part of the recording 14.

FIG. 2 schematically depicts an example of a method for play back a digitized video stream 13, 14 performed by a play back device using adapted fast forward speeds including the following steps:

Step 20 Checking the remaining play back time

Step 21 Determining a fast forward speed

22 Predefined time for play back the remaining part of the recording

Step 23 Playing back the remaining part of the recording

If an adaptive fast forward mode is selected by the user, in step 20 the remaining time to play back the remaining part of the current recording 14 is checked. Further, a predefined time 22 to play back the remaining part of the recording 14 is provided which is either given by the method or is adjustable by the user. According to this predefined play back time 22, a fast forward speed is determined in step 21 to play back the remaining part of the recording 14 within this predefined playback time 22. The remaining part of the recording 14 is then played back 23 with this determined fast forward speed. Preferably, if there are at least two fast forward speeds selectable by a user, the highest of the user selectable fast forward speeds is determined in the determining step 21 and the other fast forward speeds are kept unchanged. Alternatively, if there are at least two user selectable fast forward speeds, a second fast forward speed is set which is half of the fast forward speed set in the determining step 21 and the other fast forward speeds are kept unchanged. Alternatively, if there are at least two user selectable fast forward speeds, all fast forward speeds are set in dependence of the play back time of the remaining part of the recording 14.

FIG. 3 schematically depicts an example of a method for play back a digitized video stream 13, 14 using a scale factor for adapting fast forward speeds including the following steps:

Step 30 Checking if adaptive fast forward speed is selected
Step 31 Checking if remaining play back time of the recording is longer than a predefined time
  32 Predefined time for play back the remaining part of the recording
Step 33 Determining a scale factor
Step 34 Scaling at least one fast forward speed and calculating time steps
Step 35 Calculating a target time stamp
Step 36 Applying a time search mode
Step 37 Displaying picture
Step 38 Checking if end of recording is reached or if adapted fast forward mode is switched off
Step 39 End
Step 40 Normal fast forward mode
Step 41 Checking if fast forward play back is discontinued
Step 42 Checking if play back with normal speed is performed for a more than a predefined time
  43 Predefined time for playing back with normal play back speed In a method according to the invention, it is checked 30 if adaptive fast forward mode is selected. If adaptive forward mode is not selected, then the next step is step 40 and normal fast forward mode is applied. If adaptive fast forward mode is selected, then the next step is step 31 and it is further checked if the play back time of the remaining part of the current recording 14, played back with maximal fast forward speed available in normal fast forward mode, is longer than a predefined time 32. The predefined time 32 is either given by the play back device or is user selectable. If the play back time of the remaining part of the recording 14 is not longer than this predefined time 32, then the next step is step 40 and the remaining part of the recording 14 is played back using unchanged fast forward speeds. If the play back time of the remaining part of the recording 14 is longer than this predefined time 32, then the next step is step 33 and a scale factor is determined. The scale factor is depending on the remaining part of the recording 14, the fastest fast forward speed which is available without using the inventive method, and the predefined time 32 to play back the remaining part of the recording 14. Scaling the fastest available fast forward speed with the determined scale factor results in a fast forward speed with which the remaining part of the recording 14 is played back within the predefined time 32. At least one fast forward speed is scaled 34 by the scale factor. Preferably, at least the fastest fast forward speed which is available without using the inventive method is scaled by the scale factor. The remaining part of the play back 14 is then fast forwarded using the scaled fast forward speeds. To use the scaled fast forward speeds for adaptive search, preferably time steps corresponding to the scaled fast forward speeds are calculated 34. A time step corresponds to the length of the recording which is skipped according to time search during fast forward mode. A target time stamp is calculated 35 from the current time stamp and the time step. The current time stamp specifies the part of the recording which is currently displayed. The target time stamp specifies the part of the recording which is displayed next according to the calculated time steps. Next, time search mode is applied 36 to identify the picture which will be successively displayed. This picture is displayed 37 for a predefined time. Alternatively, a few consecutive pictures of the recording at this time stamp are displayed with normal playback speed. Next, it is checked 38 if the end of the recording 11 is reached or if the fast forward mode is switched off by the user. If the checking step is fulfilled and the next step is step 39, the method is completed. If the checking step is not fulfilled, the method continues with step 35.

Preferably, the user is enabled to discontinue the fast forward play back any time. Therefore, an optional checking step 41 is included, for example between step 37 and 38, which is shown with dashed lines in FIG. 3. In case the user discontinues adaptive fast forward play back according to the inventive method, e.g. by performing play back at single speed or at a normal fast forward speed level, then the next step is step 42. In step 42, it is checked if adaptive fast forward speed is selected again and if playback at normal fast forward speed or at single speed was performed for more than a maximum predefined time 43. If playback at normal fast forward speed or at single speed was performed for more than a maximum predefined time 43, for example 10 seconds, then the next step is step 31 and the method restarts as described above. If playback at normal fast forward speed or at single speed was performed for less than a maximum predefined time 43, for example 10 seconds, at least one of the steps 20, 21, 30, 31, 33, 34 are not performed again. Instead, the already determined fast forward speeds are used for fast forward the remaining part of the recording 14. This has the advantage that fast forward is performed with the same speeds as calculated before the short break for playback. This des not require the user to adapt to another fast forward speed.

FIG. 4 schematically depicts a device for play back a digitized video stream 13, 14 at different speed levels. The device includes a storage medium 50 which provides the digitized video stream 13, 14. Further, the device comprises a play back unit 51 including amongst others an adaptive search unit 52 which performs the inventive method. Alternatively, the adaptive search unit 52 is integrated in other units of the play back unit 51, e.g. in a main processor. The device further comprises an output which is connected to a display device 53.

The invention claimed is:

1. Method for play back of a digitized video stream at different fast forward speed levels, comprising the steps of:
   providing a user with options to select at least one predefined fast forward mode and an adaptive fast forward mode;
   in response to receiving a user-selection of the adaptive fast forward mode, checking the remaining play back time of the currently played back complete recording, exceeds a predefined fixed duration,
   in response to confirming that the remaining play back time exceeds the pre-defined fixed duration, determining, by referencing the predefined fixed duration, a fast forward speed that constrains a duration of a play back of the remaining part of the recording to be within the pre-defined fixed duration and dynamically modifying a speed of the adaptive fast forward mode to the determined fast forward speed, and
   playing back at least a first part of the remaining part of the recording in the adaptive fast forward mode;
   in response to confirming that the remaining play back time is below the pre-defined fixed duration, keeping the speed of the adaptive fast forward mode unchanged.

2. Method according to claim 1, wherein the speed of the adaptive fast forward mode is higher than a speed of the at least one predefined fast forward mode.

3. Method according to claim 1, further comprising setting a second fast forward which is half of the fast forward speed set in the determining step and keeping all other fast forward speeds unchanged.

4. Method for play back of a digitized video stream at different speed levels according to claim 1, further comprising the steps of:
- checking if the adaptive fast forward mode speed is selected,
- determining a scale factor for the speed of the adaptive fast forward mode in case both checking steps are fulfilled,
- wherein the modifying comprises scaling the speed of the adaptive fast forward mode by the scale factor, and
- fast forwarding the remaining play back with a speed of the at least one predefined fast forward mode in case one of the checking steps in not fulfilled.

5. Method according to claim 1, further comprising the steps of:
- converting the determined fast forward speed into time steps,
- calculating a target time stamp according to the current time stamp and the time steps,
- applying a time search mode for selecting a picture related to the target time stamp, and
- displaying said picture for a predefined time.

6. Play back device for play back a digitized video stream at different speed levels, characterized in that it performs a method according to claim 1.

7. Method according to claim 1, wherein the modifying further comprises scaling the speed of the adaptive fast forward mode by a scale factor dependent on the result of the determining step.

8. Method according to claim 1, further comprising:
- playing back a second part of the remaining part of the recording with single speed for at most a maximum predefined time in response to a second received user-selection; and
- playing back a third part of the remaining part of the recording with the previously determined fast forward speed in response to a third received user-selection.

9. Method according to claim 1, wherein the remaining playback time is a duration of a normal fast forward speed for the remaining part of the recording that is different from the determined fast forward speed and wherein the method further comprises:
- in response to determining that the remaining play back time fails to exceed the pre-defined fixed duration, playing back at least the first part of the remaining part of the recording with the normal fast forward speed.

10. Method according to claim 1, wherein the modifying further comprises scaling the speed of the adaptive fast forward mode by a scale factor that is dependent on the result of the determing step.

11. Method for play back of a digitized video stream at different speed levels according to claim 10, further comprising the steps of:
- checking if the adaptive fast forward speed is selected,
- determining a scale factor for the speed of the adaptive fast forward mode in case both of said checking steps are fulfilled,
- wherein the modifying comprises scaling the speed of the adaptive fast forward mode by the scale factor, and
- fast forwarding the remaining play back with a speed of the at least one predefined fast forward mode in case one of the checking steps is not fulfilled.

* * * * *